United States Patent

Brooks, III

[11] Patent Number: 6,162,000
[45] Date of Patent: *Dec. 19, 2000

[54] ENGINE AIR FILTER SELF-SEALING NUT

[76] Inventor: Leonard Wilby Brooks, III, 27703 S. Satsuma Rd., Livingston, La. 70754

[*] Notice: This patent issued on a continued prosecution application filed under 37 CFR 1.53(d), and is subject to the twenty year patent term provisions of 35 U.S.C. 154(a)(2).

[21] Appl. No.: 09/203,430

[22] Filed: Dec. 1, 1998

[51] Int. Cl.[7] ............................. A47G 3/00; B01D 39/08
[52] U.S. Cl. ......................... 411/371.1; 411/435; 55/510
[58] Field of Search .................... 411/435, 410, 411/371.1, 542, 533, 427; 123/198 E; 55/510

[56] References Cited

U.S. PATENT DOCUMENTS

| | | | |
|---|---|---|---|
| 1,393,459 | 10/1921 | Smith | 411/533 |
| 2,812,527 | 11/1957 | Pavlinetz | 411/435 |
| 2,886,129 | 5/1959 | Streete | 55/510 |
| 3,392,728 | 7/1968 | Bone | 411/533 |
| 3,546,853 | 12/1970 | Claar | 55/510 |
| 3,740,934 | 6/1973 | Shuler . | |
| 4,300,928 | 11/1981 | Sugie | 55/510 |

FOREIGN PATENT DOCUMENTS 142912  6/1990  Japan ..................................... 411/542

OTHER PUBLICATIONS

1998 Summit Racing Equipment p. 31, Sep.–Oct. '98 issue "AC Delco Wing Nut".

*Primary Examiner*—Flemming Saether

[57] ABSTRACT

An engine air filter housing nut (1) which has an o-ring (2) disposed in a circumferential groove in the side that meets the engine air filter housing.

2 Claims, 1 Drawing Sheet

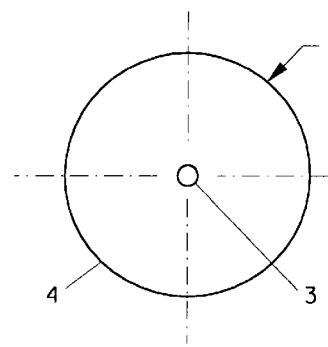
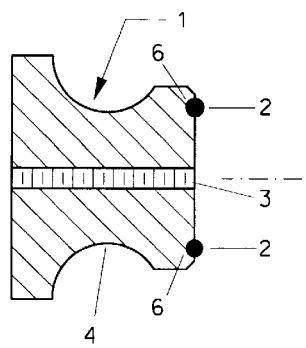
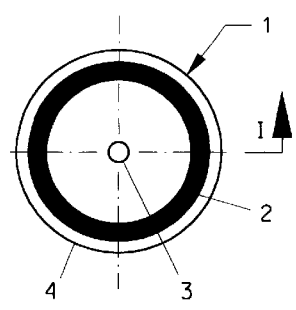
FIGURE 1B   FIGURE 1C   FIGURE 1A
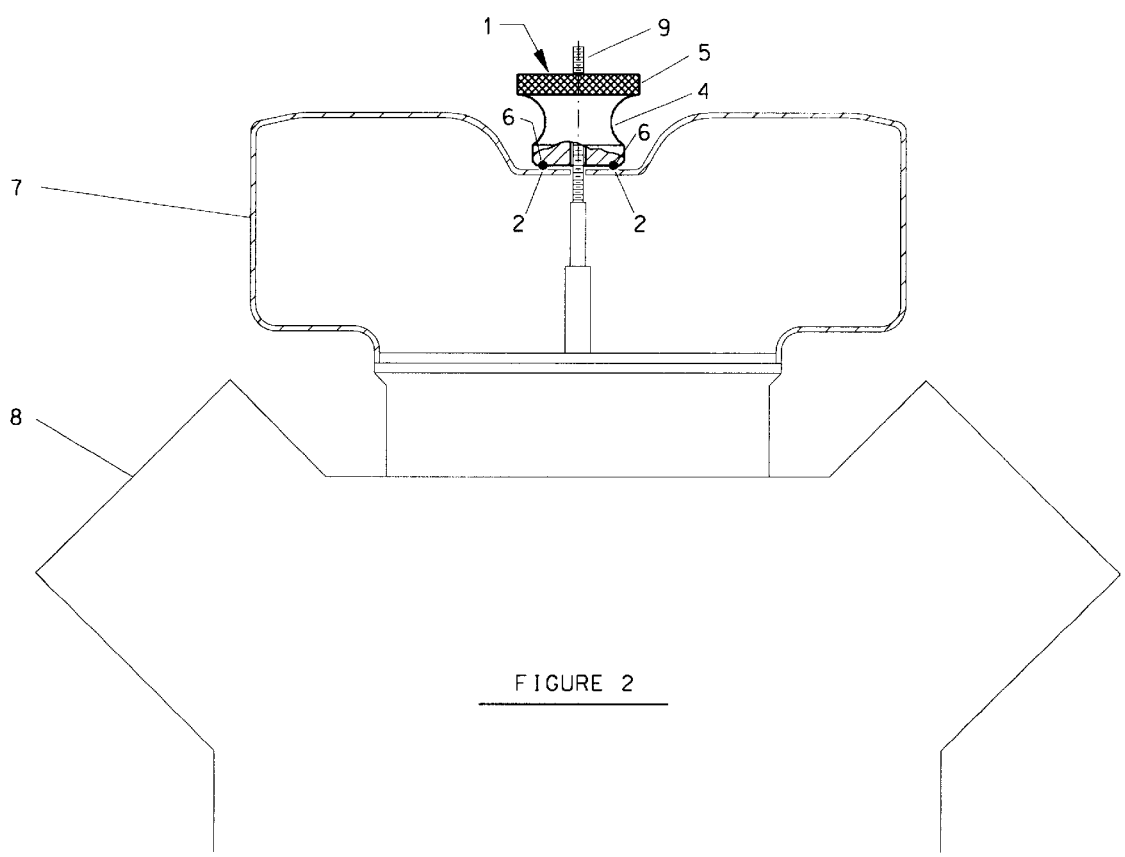
FIGURE 2

ENGINE AIR FILTER SELF-SEALING NUT

BACKGROUND OF THE INVENTION (a) Field of Invention

This invention relates to center nuts used with engine air filter housings, specifically to nuts used to protect and fasten air filter housings.

1. Description of Prior Art

Motor sports have grown in popularity in recent years and high technology continues to be utilized as a strategic advantage. The governing bodies such as NASCAR, CART, & Formula 1 invoke restrictions designed to make vehicles more alike than unique. Engine displacement, compression ratio, turbocharger boost, RPM limiters, wheel base, and even aerodynamics may be sanctioned. The key equation now is horsepower to weight. The use of carbon fiber composites and light alloys is preferred and provides a weight saving advantage but requires unique solutions. One such solution is the engine air filter housing. Its purpose is not only to provide a clamping mechanism to hold the filter element in place but also to improve flow dynamics of the induction system. Many manufacturers offer alloy and composite air filter housings that improve performance and provide a weight savings.

Presently, air filter housings are attached to carburetors or throttle bodies that have a threaded stud, with a wing nut or a hex nut. These center nuts require lock washers to prevent them from loosening. This current type of assembly poses a number of problems and disadvantages in maintaining an engine and its air filter housing in top-notch condition.

(a) Nuts which come loose allow leaks around the filter, which allow dust and water to enter and destroy an expensive engine.

(b) When using the new lighter air filter housing materials, the material is gouged by the nut and lock washer and weakened over time. This gouging can lead to early failures and reduced performance.

(c) Both the hex nut and the wing nut are difficult and cumbersome to remove and install especially when a quick change out is required. The nut and washer assembly is small and difficult to access in a tight space.

(d) Due to the condition above in (c), socket wrenches are used to remove and install nuts, however, even this technique is cumbersome since the socket wrench is an item easily misplaced.

The only existing related prior art discovered is a nut that is similarly shaped to this invention, however, does not have the o-ring, and thus this prior art is also prone to all of the disadvantages listed above.

BRIEF DESCRIPTION OF THE INVENTION

To address the problems listed above, it is an object of this invention to introduce a novel solution by turning a solid piece of aluminum on a lathe fashioning internal threads to replace the typical nut. A groove is cut into the bottom face where an o-ring is inserted, thus providing a barrier to protect the engine air filter housing without the use of a damaging lock washer. The nut is installed and removed without tools.

Accordingly, besides the objects and advantages of my invention described above, several objects and advantages of the present invention are:

(a) The o-ring is made of a compressible material, providing a tight seal between the top of the air filter housing and the nut. This feature protects the engine from water leaking into the engine when washed between uses.

(b) The o-ring has a high coefficient of friction, eliminating the need for a locking washer.

(c) Since the surface of the o-ring is smooth, the nut does not scratch the alloy or cut into the fibers of composite air filter housing, eliminating the failure of the air filter housing.

(d) The nut has a knurled ridge around the top circumference to make installation and removal without tools possible. This ease of installation and removal is critical in the timing of change-outs for pit stops and between races.

(e) The nut can be offered in anodized colors to match the rest of the engine package or sponsors' colors. This is especially useful and desirable by racing teams, engine restoration enthusiasts, and those who enjoy implementing the best looking and most technologically advanced accessories in maintaining their engines.

(f) A body shape of the nut can be manufactured from light alloys or from injection molded polymers to save weight and cost.

Still further objects and advantages will become apparent from a consideration of the insuring description and drawings.

BRIEF DESCRIPTION OF THE SEVERAL VIEWS OF THE DRAWINGS

The drawings show various aspects of the nut including the approximate body shape of the nut, the internal thread configuration and the o-ring.

FIG. 1A, is a bottom view of the nut shoeing the o-ring. FIG. 1B, is a top view of the nut. FIG. 1C, is a cross-sectional view of the nut along line I—I as seen in FIG. 1A.

DESCRIPTION

According to the objects of the invention, FIG. 2 shows the assembly of an engine air filter housing 7 and a nut 1. The nut being threaded on a protruding screw 9 in order to retain the air filter housing to an engine 8.

FIGS. 1A–1C show a typical embodiment of the nut 1 of the present invention.

FIG. 2, shows a partial cross section of the nut 1 engaging the engine air filter housing. FIG. 1A shows a view from the bottom of the nut 1. A two-dimensional visual representation of how the installed o-ring 2 protrudes from the bottom is the main feature shown. In addition, one can see that in the middle of the nut is the internal thread 3. FIG. 1B shows a view from the top of the nut 1. This view shows how the internal thread 3 configuration is an advantage over the typical nut or wing nut by being easy to handle due to the larger body shape 4 of the entire self-sealing nut 1 where it can be seen the O-ring 2 has a thickness which is substantially less than the area of the bottom surface so as to occupy less than half the bottom surface area. FIG. 1C shows a cross sectional view of a typical body shape 4 construction of the nut 1 being the trumpet shape. Other body shapes 4 are possible as well, including more curvature, less curvature, square, cylindrical, or a grooved curvature to accommodate finger holds. The knurled top ridge 5 is indicated in FIG. 2. It is important to note here as well, that the round body shape 4 of the nut 1 shown in FIGS. 1A and 1B can also be made in other shapes, such as to accommodate finger holds, and need not be round. An additional important item to note in FIG. 1C is that the configuration of the internal threads 3 and the o-ring 2 are not limited to any particular spacing requirements. Also in FIG. 1C the o-ring 2 and groove 6 in which it is placed are round, however, any shape of o-ring 2 and groove 6 could be used, such as a square or a trapezoidal shape.

From the description above, a number of advantages of the nut become evident:

(a) The nut can be made in a number of different shapes and/or sizes to meet differing engine air filter housing designs and differing customer preferences.

(b) The o-ring used can be purchased from a number of different manufacturers, including those who make not only round ones, but also square ones, or other shapes. A few examples of suitable o-ring suppliers include Summit Racing Equipment and Northern Hydraulics.

(c) The o-ring used can be made out of a number of different types of polymeric materials. A few examples of suitable o-ring polymers include butyl rubber, elastomers, and nylon.

(d) The protruding o-ring clearly indicates how an air, water, and dust tight seal will be made with the engine air filter housing, while being held firmly in place under compression and protects the surface on the air filter housing.

(e) The possible materials of construction of the self-sealing nut are widely available and include aluminum, plastic, fiberglass, or other composites.

(f) The assembly of the o-ring and nut require no glue or other fastening device or material. They are simply held together by the elasticity of the o-ring.

The manner of using the nut to fasten the air filter housing securely in place is similar, but simpler than currently used hex or wing nuts. To install the self sealing nut, one places the air filter cover in place over the protruding screw and tightens down the nut by hand, in a clockwise direction, until it feels tight and the o-ring is in compression with the air filter housing. To remove the self-sealing nut, one turns it by hand, in a counter-clockwise direction. No tools are necessary and there is no need to search for small lock washers that are difficult to grasp scratch expensive engine air housing surfaces, and easily fall into the engine.

Accordingly, the reader will see that the nut of this invention can be used to secure air filter assemblies in a very convenient manner that is novel and superior in performance to nuts presently used. Use of the nut in this manner is novel over prior art in that its main purpose is to protect the air filter housing and this type of the product has never been observed in the marketplace. The nut is easy to install, easy to remove and is not easily lost, dropped, or misplaced during change-outs. It won't scratch, mar, or harm the air filter housing in any way and stays put during the most severe service conditions, such as in dirt track racing. In addition, its visual appeal is a tremendous improvement over currently used nuts and adds a special touch to the appearance of any engine, whether in a car, truck, racer, airplane, or lawnmower. For those who enjoy improving their engines, this nut will be a natural accessory to add.

Although the description above contains many specificities, these should not be construed as limiting the scope of the invention but as merely providing illustrations of some of the presently preferred embodiments of this invention. For example, the nut having other shapes, such as to accommodate finger holds, etc.; the o-ring having other shapes such as round, square, or trapezoidal, etc. Thus the scope of the invention should be determined by the appended claims and their legal equivalents, rather than by the examples given.

I claim:

1. A nut in combination with an engine air filter housing comprising:

the nut including a nut body having a top surface and a bottom surface, with a threaded bore extending therethrough between the top and bottom surfaces, the bottom surface being generally planer with a groove cut therein circumferentially around the threaded bore, an O-ring received within the groove and elastically retained therein, the O-ring having a thickness which is substantially less than the area of the bottom surface so as to occupy less than half the bottom surface area;

the nut and the air filter housing are received on a protruding screw such that the O-ring engages and compress against the filter housing whereby the O-ring both seals and protects the air filter housing and provides a locking to inhibit the center nut from backing off the screw.

2. The combination of claim 1 wherein the nut is trumpet shaped with a knurled top ridge.

* * * * *